United States Patent [19]

Jones

[11] Patent Number: 5,734,208
[45] Date of Patent: Mar. 31, 1998

[54] DYNAMIC TERMINATION FOR SIGNAL BUSES GOING TO A CONNECTOR

[75] Inventor: Leroy Jones, Austin, Tex.

[73] Assignee: Dell USA, L.P., Austin, Tex.

[21] Appl. No.: 664,982

[22] Filed: Jun. 14, 1996

[51] Int. Cl.$^6$ ............................................. H01R 9/07
[52] U.S. Cl. ..................... 307/139; 307/116; 307/125; 395/280; 395/281; 326/30
[58] Field of Search ............................. 307/139, 125, 307/116, 147; 395/280, 281; 326/30, 31

[56] References Cited

U.S. PATENT DOCUMENTS

| | | | |
|---|---|---|---|
| 3,832,575 | 8/1974 | Dasgupta et al. | 326/30 |
| 5,467,453 | 11/1995 | Kocis | 395/281 |
| 5,469,554 | 11/1995 | Tucker et al. | 395/420 |
| 5,578,940 | 11/1996 | Dillon et al. | 326/30 |
| 5,613,074 | 3/1997 | Galloway | 395/280 |

*Primary Examiner*—Richard T. Elms
*Assistant Examiner*—Albert W. Paladini
*Attorney, Agent, or Firm*—Haynes and Boone L.L.P.

[57] ABSTRACT

A method and apparatus for dynamically providing an AC termination for a signal bus going to a connector. A circuit is provided that senses whether the connector is occupied. If the connector is un-occupied, an AC termination circuit is dynamically enabled to provide appropriate termination of the signal bus. If the connector is occupied, the AC termination circuit is dynamically disabled so that the signal bus has no termination at the connector. The circuit has application in a personal computer.

21 Claims, 2 Drawing Sheets

DYNAMIC TERMINATION FOR SIGNAL BUSES GOING TO A CONNECTOR

TECHNICAL FIELD

The invention relates generally to termination circuits for electronic signals and, more particularly, to a circuit and method for dynamic termination of signal buses that are provided for optional circuits or devices.

BACKGROUND OF THE INVENTION

Many electronic devices, such as computers, are designed to allow easy addition, removal and replacement of electrical components. For example, most computers have one or more "connectors" in which to receive an electrical component. A typical electrical connector is a device that selectively engages two components to come in electrical contact with each other, or disengages the components wherein the components become electrically isolated. Once engaged, electrical contact is achieved through the connection of one or more electrical connection points located on each component to interconnect power and/or data buses between the components. Some examples of connectors include memory slots, for single-in-line-memory-modules ("SIMMs"), sockets for integrated circuits ("ICs"), and peripheral connectors for plug-in cards containing peripheral devices.

Many connectors are permanently attached to a host component for receiving a peripheral component so that power and/or data signals can flow therebetween. If the peripheral component is engaged in the connector, then the connector is "occupied". When the connector is occupied, the peripheral component not only uses the power and/or data signals, but it can also properly terminate a bus on which the signals reside. Alternatively, if the peripheral component is not engaged in the connector, the connector is "unoccupied". A problem associated with unoccupied connectors is that a power and/or data bus from the host component is left un-terminated at the connector.

This problem is exacerbated by technological advances in signal speed, or frequency. As a result, un-terminated signals produce emissions at high levels, which converts unoccupied connectors into incidental radiators of electronic emissions. Furthermore, many governmental agencies restrict incidental radiators of electronic emissions. (e.g. 37 C.F.R. §15.13). Therefore, the electronic emissions from unoccupied connectors must be reduced.

The conventional solution to the above-described problem is to place an alternating current ("AC") termination circuit on a signal bus near the connection point on the host component. However, this solution introduces a new set of problems when a connector is occupied, because the termination for the signal bus on the host component is in the middle of the bus instead of at the end. Such termination is improper and produces undesirable transmission line effects, including signal degradation.

Therefore, what is needed is a means for terminating the signal buses near the connection point only when a connector is unoccupied.

SUMMARY OF THE INVENTION

The foregoing problems are solved and a technical advance is achieved by a method and apparatus for dynamically providing AC termination for signal buses going to a connector. In a departure from the art, the present invention provides a circuit that senses whether the connector is occupied. If the connector is un-occupied, an AC termination circuit is dynamically enabled to provide appropriate termination of the signal buses. If the connector is occupied, the AC termination circuit is dynamically disabled so that the signal bus has no termination in the middle of the bus.

A technical advantage achieved with the invention is that the signal buses are terminated near the connection point when the connector is unoccupied.

Another technical advantage achieved with the invention is that the signal buses are not terminated near the connection point when the connector is occupied.

DETAILED DESCRIPTION OF THE PREFERRED EMBODIMENT

Figure 1:
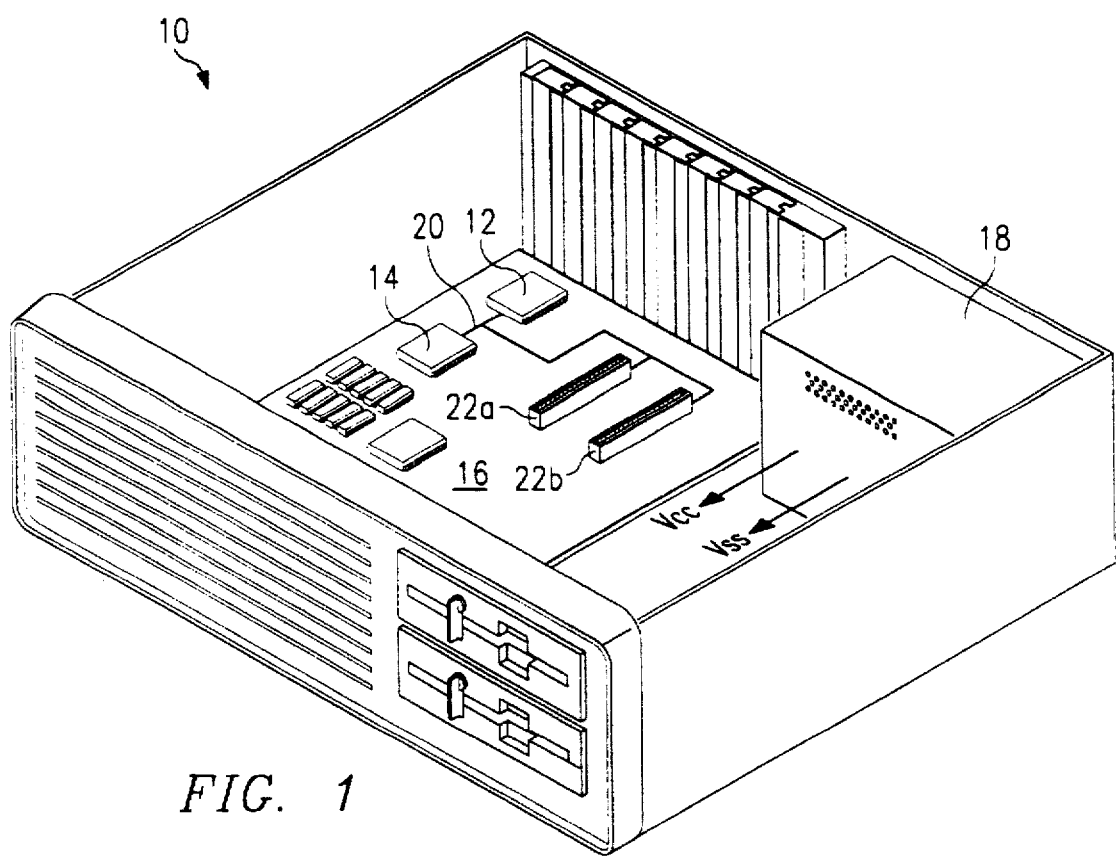
FIG. 1 is a diagram of a personal computer for implementing features of the present invention.

Referring to FIG. 1, a personal computer (PC) capable of sending and receiving signals is designated by a reference numeral 10. The PC 10 includes a plurality of devices including a processing unit 12 and a clock driver 14, both of which located on a PC board 16. The processing unit 12 and the clock driver 14 are merely representative of devices capable of driving a signal bus.

The PC 10 also includes a power supply 18. The power supply 18 supplies a positive external power supply (VCC) and a negative external power supply (VSS) that is utilized throughout the PC 10. The PC 10 uses a system of buses, such as a VCC bus, VSS bus, and a signal bus 20, to interconnect the devices 12 and 14 and supply power and data signals therebetween. The bus 20 also connects the processing unit 12 and/or the clock driver 14 to a first connector 22a and a second connector 22b.

Figure 2:
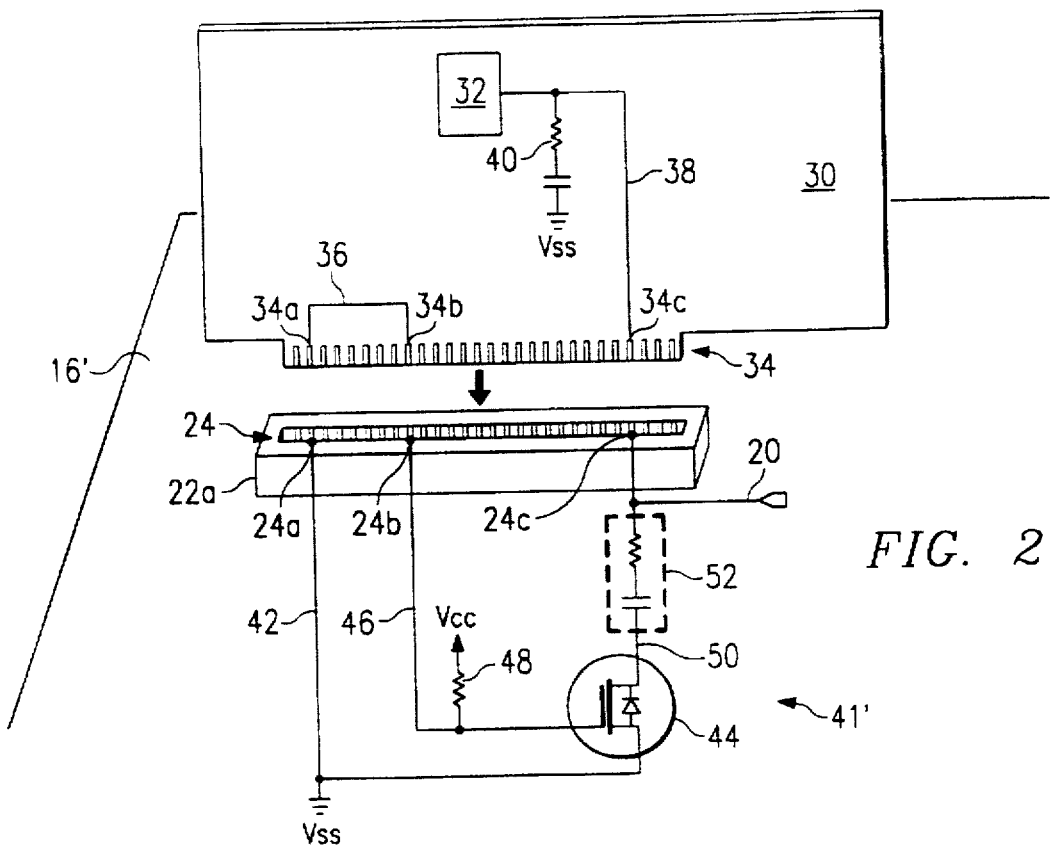
FIG. 2 is a circuit diagram illustrating a first embodiment of a termination circuit for a connector in the personal computer of FIG. 1.

Referring to FIG. 2, a first embodiment of the PC board 16, hereinafter designated by the reference numeral 16', is shown with the connector 22a. Also shown with the PC board 16' is the VCC bus, VSS bus, and signal bus 20. Although only the connector 22a is shown, the present invention also applies equally with the connector 22b and any other connectors included with the PC 10. The connector 22a also includes a plurality of connection points, referenced generally by the number 24.

The connector 22a receives a plug-in card 30 that contains a peripheral device 32 and a plurality of connection points, referenced generally by the number 34 and which align with the connection points 24 of the connector 22a. The plug in card 30 includes a jumper bus 36 that connects a first point 34a with a second point 34b of the connection points 34. The plug-in card 30 also includes a signal bus 38 that connects the peripheral device 32 with a third point 34c of the connection points 34. Also attached to the signal bus 38, near the peripheral device 32, is a conventional AC terminator 40 comprising a resistor and a capacitor. Although not shown, the plug-in card 30 is also connected to the VCC and VSS buses.

The PC board 16' includes a plurality of buses and devices, referenced generally as a dynamic termination circuit 41'. The dynamic termination circuit 41' includes a bus 42 that electrically connects the VSS bus with a connection point 24a of the connector 22a, which aligns with the connection point 34a, and with a source of a field effect transistor (FET) 44. The dynamic termination circuit 41' also includes a bus 46 that electrically connects a connection point 24b of the connector 22a, which aligns with the connection point 34b, with a pull-up resistor 48 and a gate of the FET 44. The pull-up resistor 48 is also electrically connected to the VCC bus. The dynamic termination circuit 41' also includes a bus 50 that electrically connects a drain of the FET 44 with a first node of an AC terminator 52. A second node of the AC terminator 52 is electrically connected to the signal bus 20. The signal bus 20 is also electrically connected to a connection point 24c of the connector 22a, which aligns with the connection point 34c.

In operation, the dynamic termination circuit 41' is responsive to whether or not the connector 22a is occupied with the plug-in card 30. If the connector 22a is occupied, the bus 46 is electrically connected to the VSS bus through the jumper bus 36 and the bus 42. As a result, the base of the FET 44 is "low", thereby connecting the first node of the AC terminator 52 to the VSS bus. Because the AC terminator 52 is connected to the VSS bus and to the signal bus 20, the signal bus 20 is now properly terminated.

If the connector 22a is unoccupied, the bus 46 is electrically connected to the VCC bus through the pull-up resistor 48. As a result, the base of the FET 44 is "high", thereby disconnecting the first node of the AC terminator 52 from the VSS bus. Because the AC terminator 52 is not connected to the VSS bus, it is an open circuit, which has no significant effect on the signal bus 20. The signal bus 20 is, however, terminated by the AC terminator 40 on the plug-in card 30.

Figure 3:
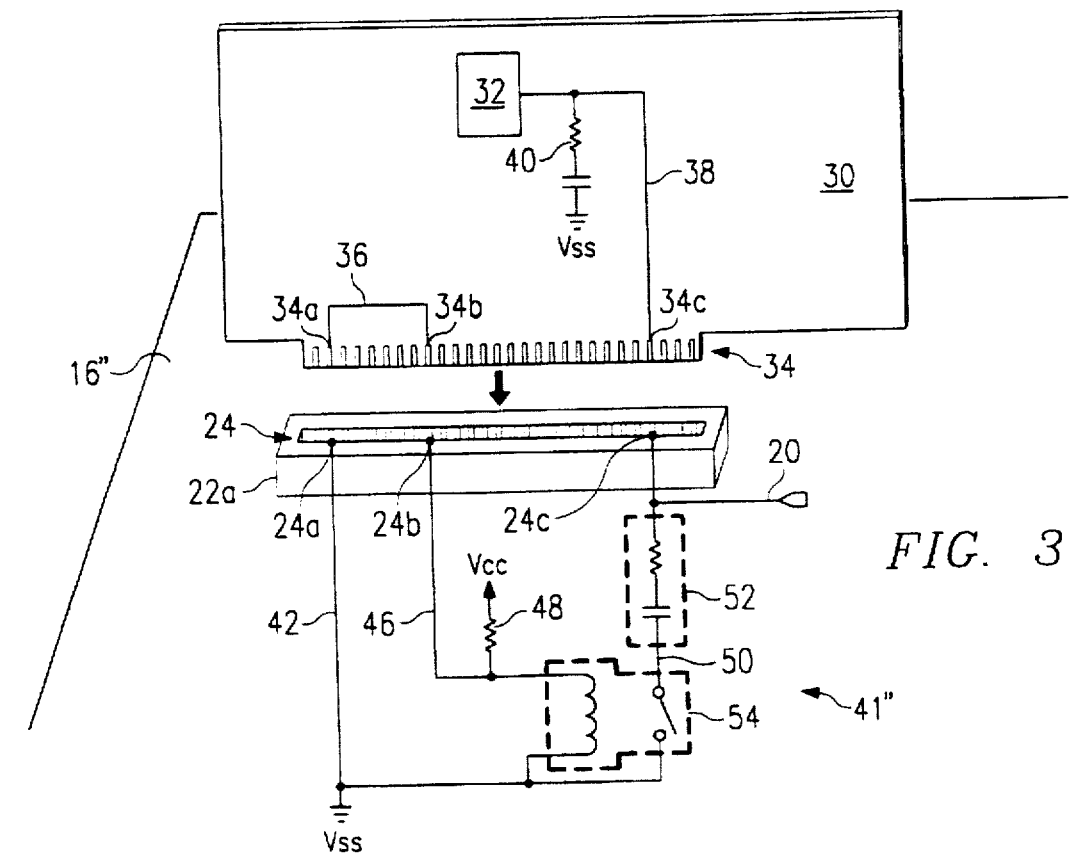
FIG. 3 is a circuit diagram illustrating a second embodiment of a termination circuit for a connector in the personal computer of FIG. 1.

Referring to FIG. 3, a second embodiment of the PC board, designated by the reference numeral 16", is shown with the connector 22a. The PC board 16" includes a plurality of buses and devices, referenced generally as a dynamic termination circuit 41". The dynamic termination circuit 41" is identical to the dynamic termination circuit 41', except that instead of the FET 44, the dynamic termination circuit 41" includes a relay switch 54. In operation, the dynamic termination circuit 41" behaves similarly to the dynamic termination circuit 41'.

In a third embodiment (not shown), a termination circuit is included with the connector, so that the connector does not have to be permanently mounted to any device, such as a PC board 16.

Therefore, it is understood that the present invention can take many forms and embodiments. The embodiments shown herein are intended to illustrate rather than to limit the invention, it being appreciated that variations may be made without departing from the spirit or the scope of the invention. For example, the present invention may be used in many different types of connectors, such as chip sockets and SIMM slots. Furthermore, although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising a signal bus and a connector for connecting the signal bus to a device, a circuit for dynamically providing termination to the signal bus, the circuit comprising;

a terminator circuit with two terminals, wherein the first terminal is connected to the signal bus; and a switch directly connected to the second terminal for selectively connecting the second terminal to a first voltage source, wherein completion of an internal circuit in the plug in card causes to switch to be activated when a device is connected to the connector.

2. The circuit of claim 1 further comprising a pull-up resistor connected between the second terminal and a second voltage source.

3. The circuit of claim 1 wherein the switch is a FET.

4. The circuit of claim 2 wherein the switch is a FET which has a gate connected to the pull-up resistor, a source connected to the voltage source, and a drain connected to the second terminal.

5. The circuit of claim 1 wherein the switch is a relay.

6. The circuit of claim 4 wherein the base is connected to the first voltage source when the connector is occupied.

7. The circuit of claim 6 wherein the base is connected to the second voltage source through the pull-up resistor when the connector is unoccupied.

8. The circuit of claim 1 wherein the terminator circuit comprises a resistor and a capacitor.

9. A method for dynamically terminating a signal bus that runs to a connector, the method comprising:

placing a termination circuit for the signal bus near the connector;

connecting a first node of the termination circuit to the signal bus and a switch; and connecting a second node of the termination circuit to the switch, wherein the switch selectively connects the second node to a first voltage source in in response to completion of an internal circuit in the plug in card which causes a switch to be activated when a device is connected to the connector.

10. The method of claim 9 further comprising connecting a pull-up resistor to the second node.

11. The method of claim 9 wherein the switch is a FET.

12. The method of claim 10 wherein the switch is a FET and further comprising:

connecting a gate of the FET to the pull-up resistor;

connecting a source of the FET to the first voltage source; and connecting a drain of the FET to the second node.

13. The method of claim 9 wherein the switch is a relay.

14. The method of claim 12 further comprising connecting the base to the first voltage source when the connector is occupied.

15. The method of claim 12 further comprising connecting the gate of the FET to a second voltage source through the pull-up resistor when the connector is un-occupied.

16. The method of claim 9 wherein the termination circuit comprises a resistor and a capacitor.

17. An apparatus for connecting a first signal bus from a first device to a second signal bus from a second device, comprising:

a terminator circuit with two terminals, wherein the first terminal is connected to the first signal bus; and a switch directly connected to the first signal bus for selectively connecting the second terminal to a voltage source, wherein the switch is responsive to whether or not the first and second device are connected.

18. The apparatus of claim 17 wherein the switch is a FET.

19. The apparatus of claim 18 wherein the switch is a FET which has a gate connected to a pull-up resistor, a source connected to the voltage source, and a drain connected to the second terminal.

20. The apparatus of claim 17 wherein the switch is a relay.

21. The apparatus of claim 17 wherein the terminator circuit comprises a resistor and a capacitor.

* * * * *